June 6, 1967  A. FOTI ET AL  3,324,258
MOTOR MECHANISM FOR OPERATING OUTDOOR AIR BREAK SWITCHES
Filed Dec. 23, 1965  10 Sheets-Sheet 9

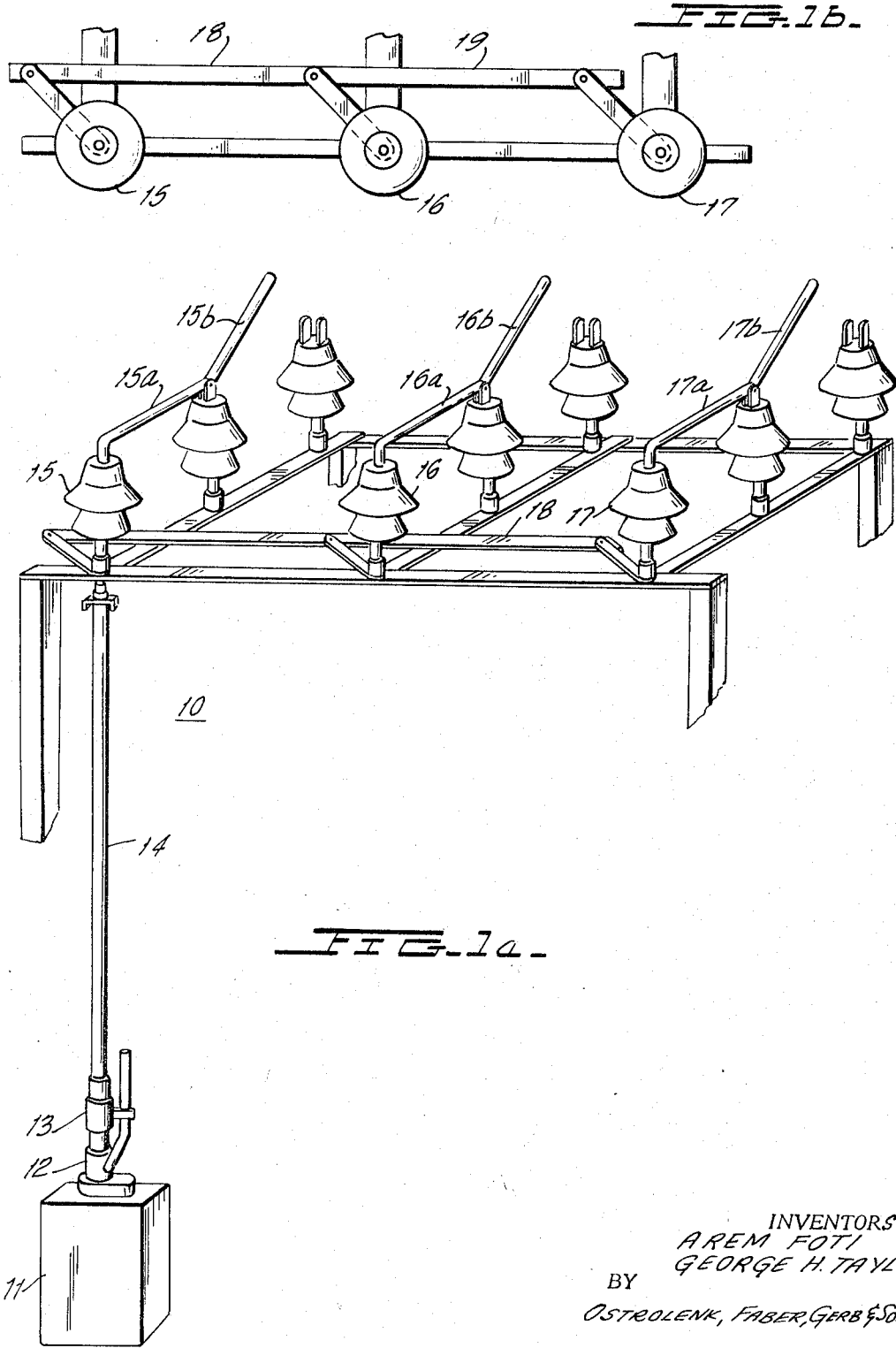

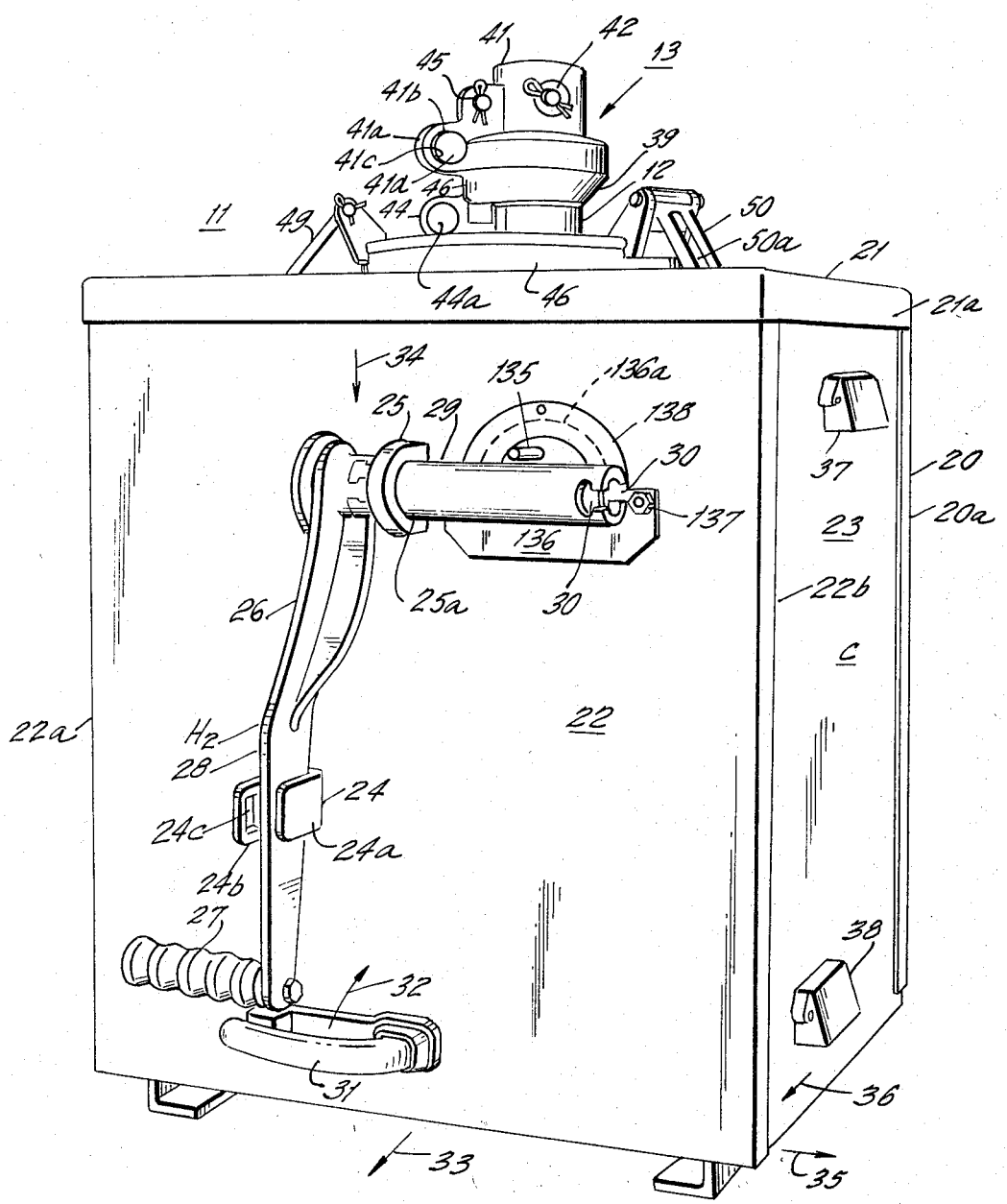

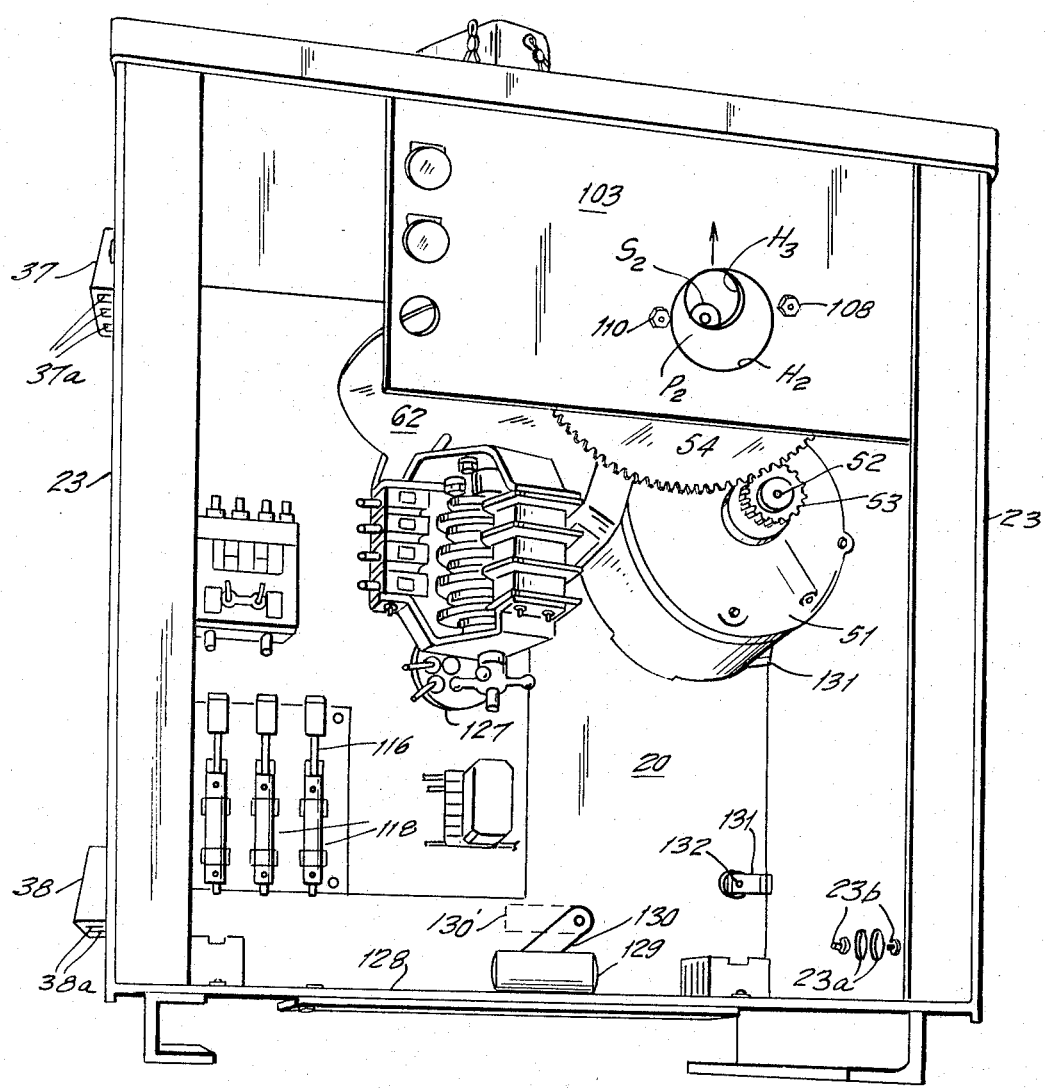

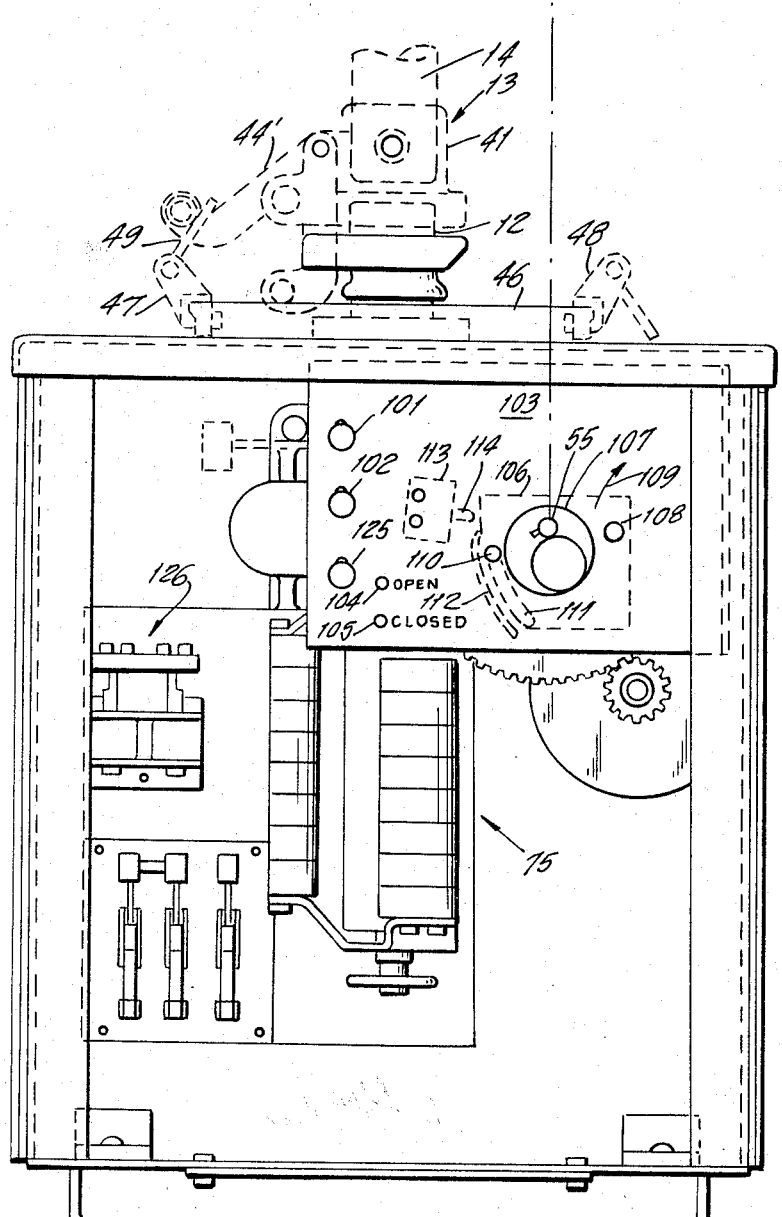

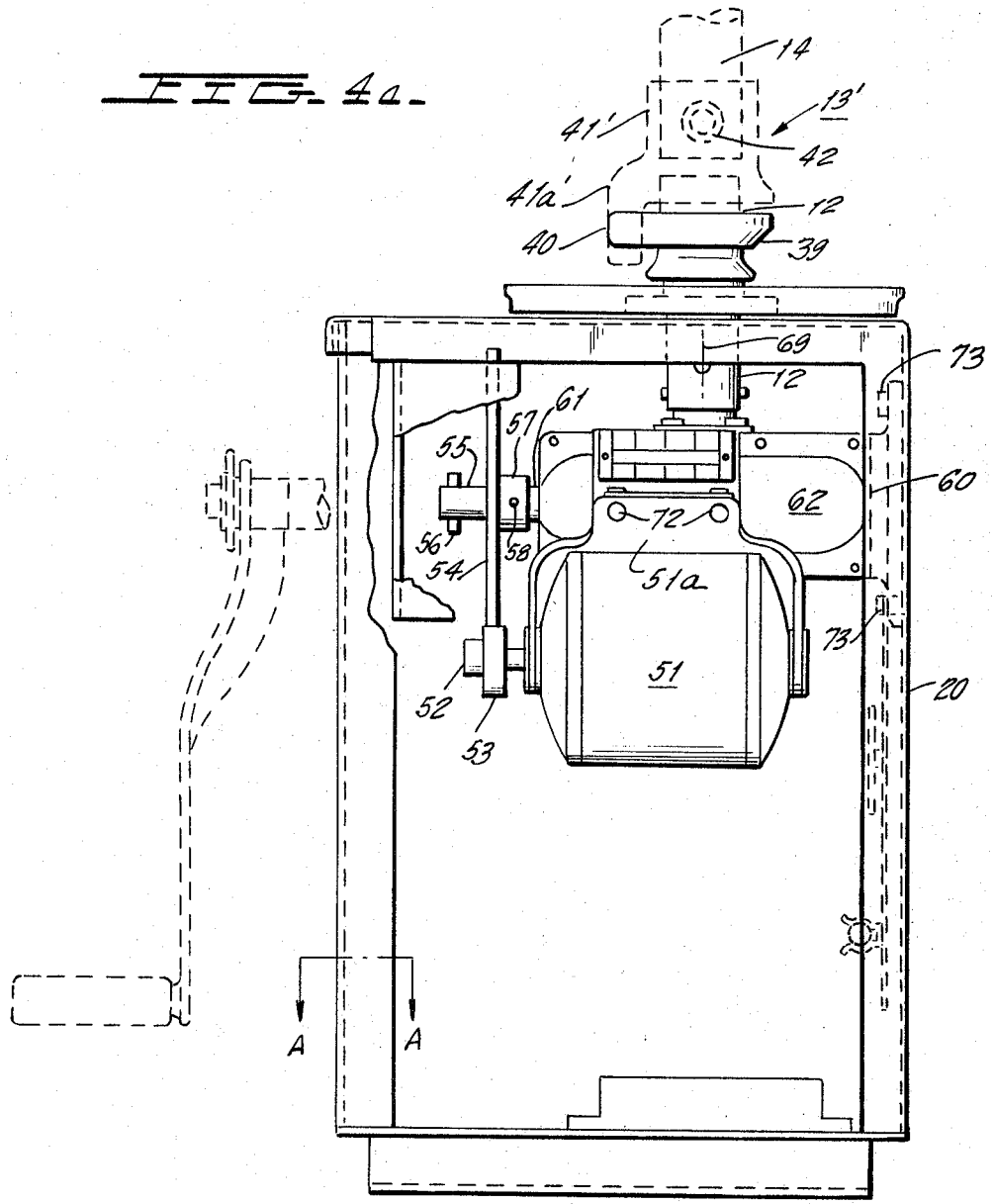

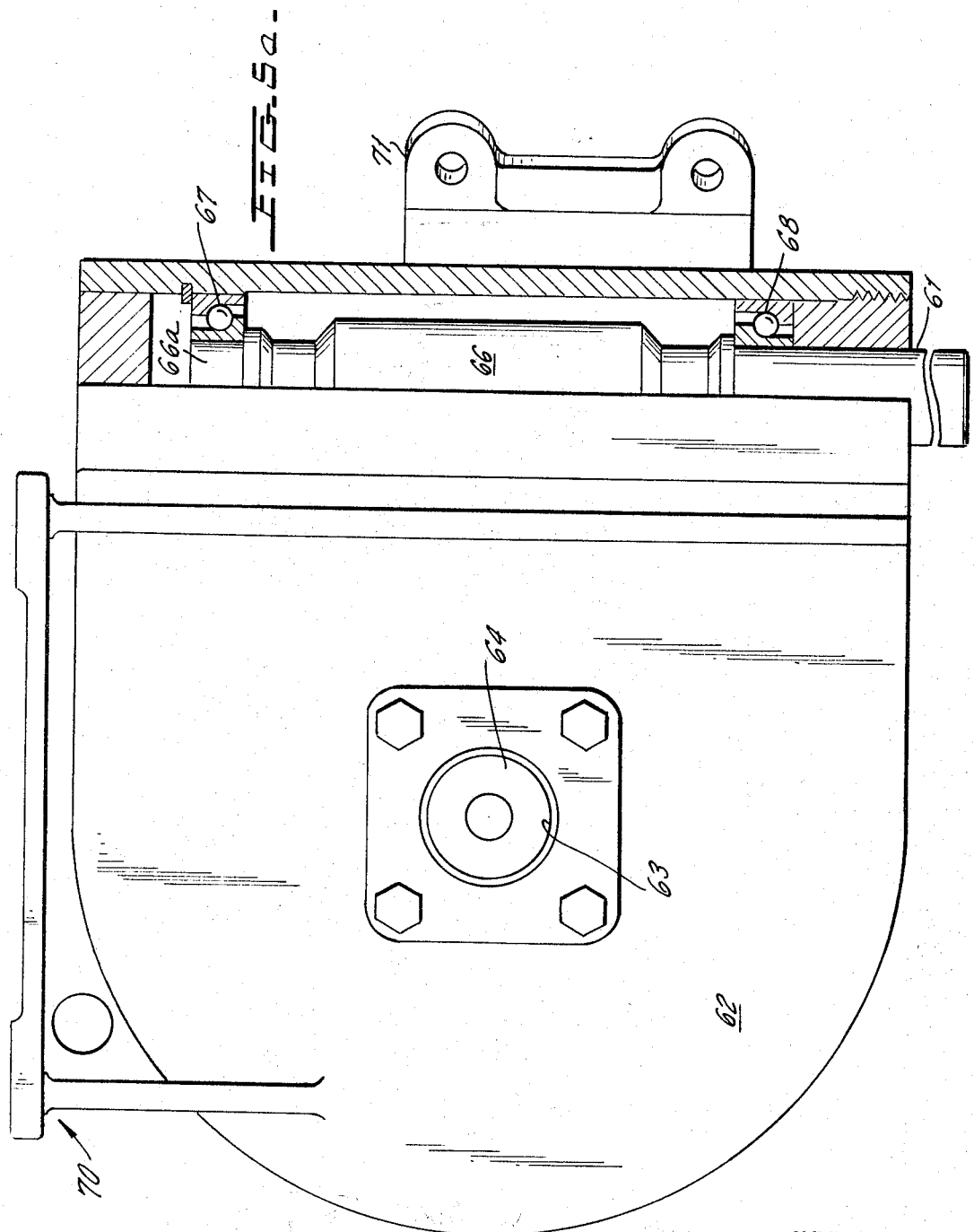

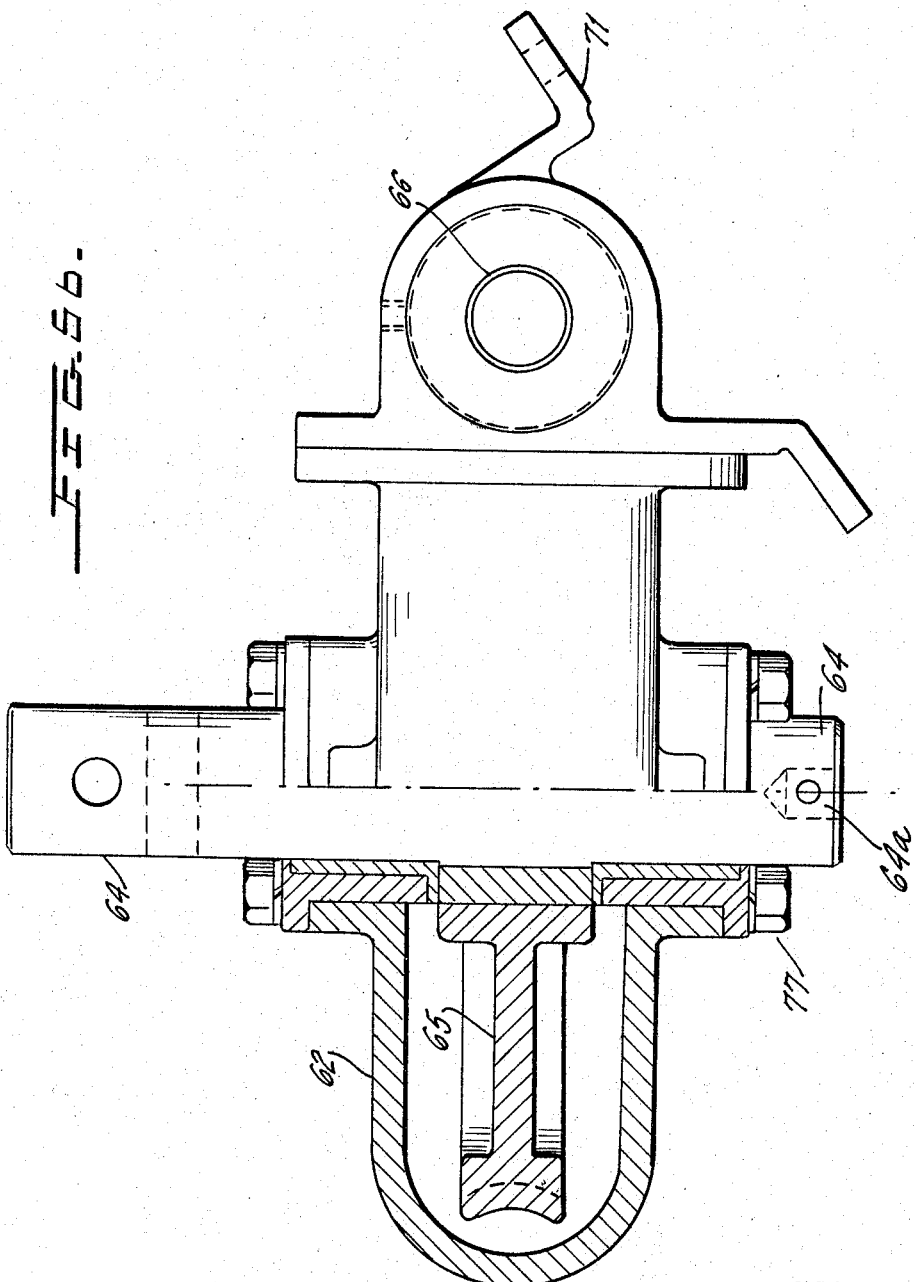

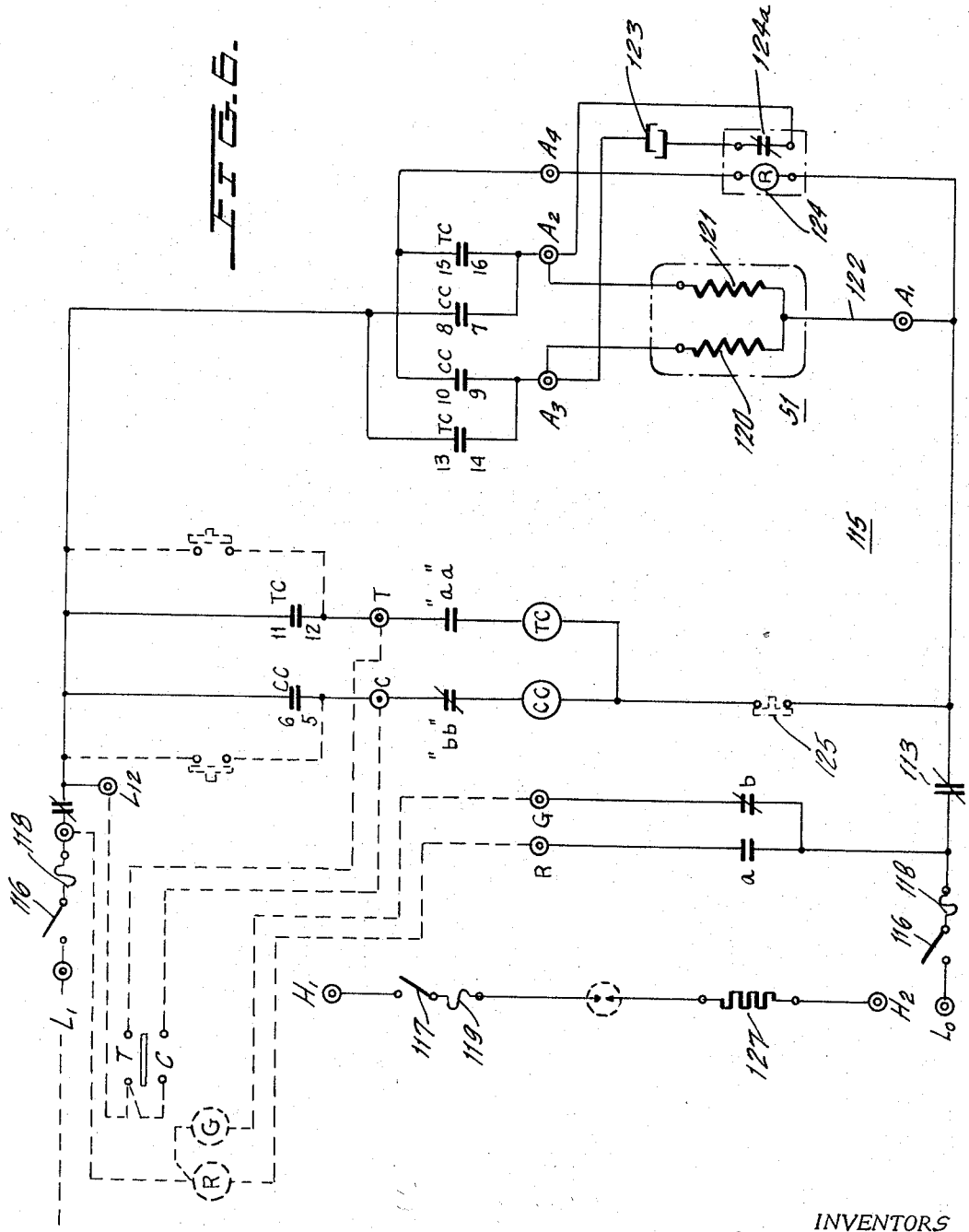

INVENTORS
AREM FOTI
GEORGE H. TAYLOR
BY
OSTROLENK, FABER, GERB & SOFFEN
ATTORNEYS

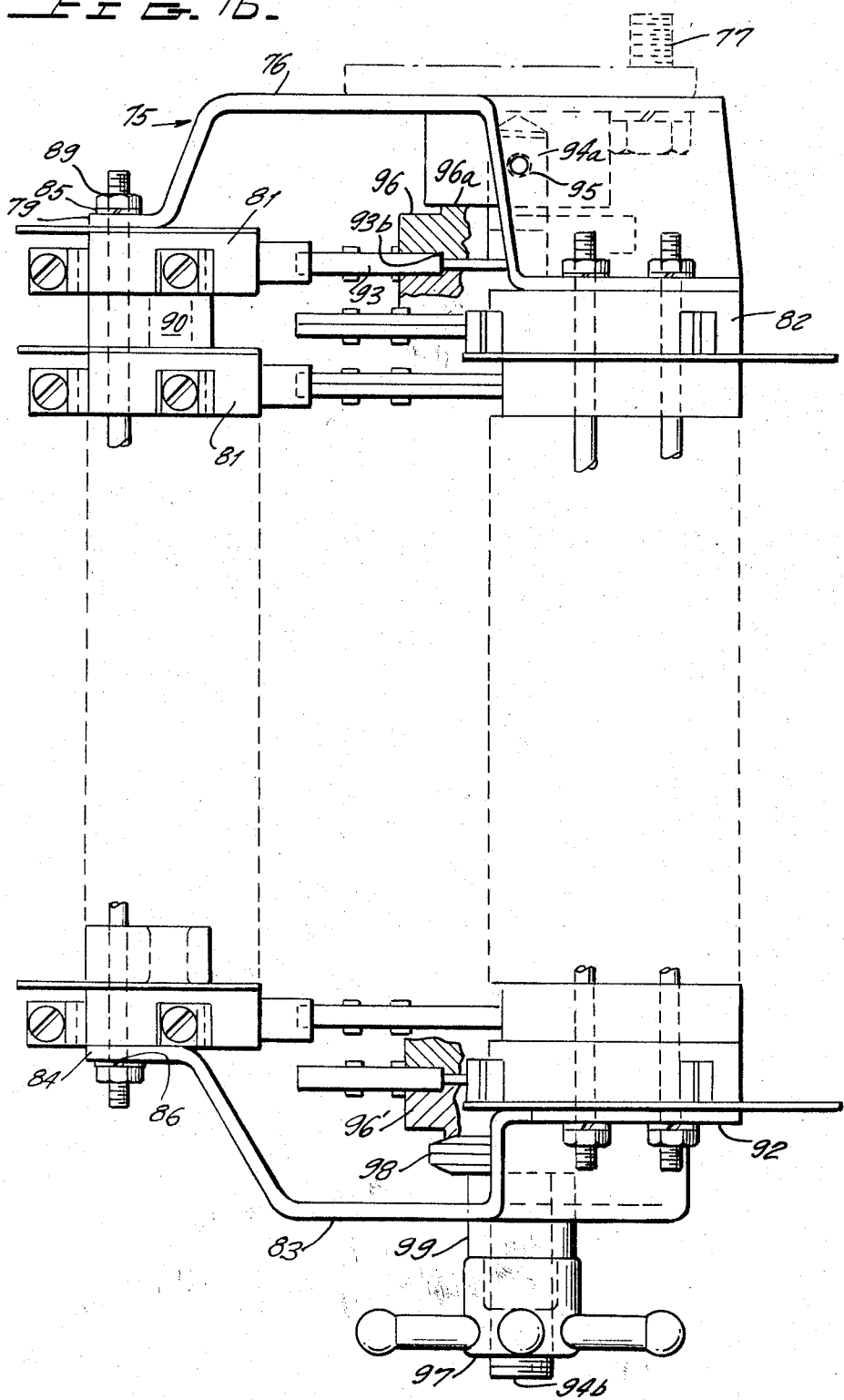

United States Patent Office 3,324,258
Patented June 6, 1967

3,324,258
MOTOR MECHANISM FOR OPERATING OUTDOOR AIR BREAK SWITCHES
Arem Foti and George H. Taylor, Greensburg, Pa., assignors to I-T-E Circuit Breaker Company, Philadelphia, Pa., a corporation of Pennsylvania
Filed Dec. 23, 1965, Ser. No. 516,037
12 Claims. (Cl. 200—48)

The instant invention relates to switch operating means and more particularly to a motor operator for providing torsional switch operation which is capable of functioning either electrically or manually.

There exists a wide variety of devices which require rotational driving means for their operation. One typical, but by no means limiting, device is that of an air break switch which is coupled to the switch operating mechanism by means of a vertically aligned coupling pipe which rotates about its own longitudinal axis to either open or close the air break switch assembly.

Such air brake switches are relatively large devices requiring an operating means which provides sufficient torque for performing the opening and closing operations. It is also important to prohibit such operating devices from rotating upon preset limits which may place severe strain upon the air break switch mechanism and possibly subject it to breakage. While such operating devices may preferably be controlled from locations remote from the operating device there may also exist emergency or other special purpose situations which require the manual operation of the device.

The instant invention is characterized by providing an electrically operated mechanism which is coupled to the rotatable output shaft by a gear assembly which provides the necessary torque for operating air break switches or other similar devices. A cam controlled switch assembly is mounted to rotate with the output shaft for the purpose of automatically halting rotation of the output shaft at the fully open and fully closed positions. Additional cam controlled switches are employed for the purpose of energizing indicating lamps, or other similar devices, at either local or remote points for providing a visual indication of the state of the motor controlled operator at any given instant. All of the cam controlled switches are mounted upon a common mounting assembly and are independently adjustable to control the rotational limits of the operator as well as to provide different visual indications.

The gear assembly coupling the motor output shaft to the operator output shaft provides a large mechanical advantage, while at the same time preventing any undesirable back-feed.

In addition to the power operation, the operator is capable of being manually operated through a padlocked operating handle mounted on the outside of the operator housing. A possessor of the appropriate security key may remove this manual operating handle for insertion to the manual input shaft. In order to couple the manually operating handle to the manual input shaft, the manual operating handle must be inserted through a shutter member having an opening for receiving same. The opening is offset relative to the manual input shaft, necessitating rotation of the shutter to align the opening with the shaft. This causes operation of a switch preventing power operation of the operator device during the time that it is being manually operated.

The cam controlled limit switches automatically terminate rotation of the operator output shaft through a dynamic braking arrangement. In the case of A.C. operation, a capacitor-start, induction-run motor is employed, giving inherent dynamic braking. In the case of D.C., energization, the cam operated limit switches are arranged to disconnect the energized field of the motor and simultaneously connect the reverse field of the motor. The back E.M.F. of the motor is used as the power source, and passing through the reverse field, bucks the initial rotation and stops the motor. Either of these arrangements avoid the need for additional manually operable braking means.

The output shaft of the operator device is connected to an air break switch through either of two alternative coupling means. One coupling means permits either the air break switch or the operator to be operated independently of one another for test purposes without the test operation of one causing any movement in the other. However, in order to positively couple the switch means to the operator there must be exact correspondence between the position of the motor mechanism and the position of the air switch.

The alternative coupling provides only direct coupling between the motor operator and the air break switch so that a test operation of one will be directly coupled to the other.

The housing employed for enclosing the motor operator device requires removal of the front cover before any of the side covers of the housing may be removed. The front cover has mounted thereon the manual operating handle which is padlocked thereto. Thus, the padlock must first be unlocked and the manual operating handle must first be removed before the front cover can be removed. The side covers may not be removed until the front cover is lifted away from the covering position. The handles for lifting the housing are provided along the side covers and act to shield the screen within the housing from permitting the ingress of rain, dirt or insects.

In the case where it is desired to lock the air break switch and motor operator into any position, the coupling means are provided with a locking assembly which may be padlocked to lock the operator device in the engaged position or in the open or closed air break switch position.

It is therefore one object of the instant invention to provide a novel motor operator device.

Another object of the instant invention is to provide a novel operator device capable of providing either an electrical or manual controlled output.

Another object of the instant invention is to provide a novel motor operator device for controlling air break switches and the like.

Another object of the instant invention is to provide a novel motor operator device for controlling air break switches and the like wherein automatic means are provided for stopping motion of the operator device upon reaching the open and closed positions.

Still another object of the instant invention is to provide a motor operator device having novel cam operated switching means for controlling the operating limits of the device and for providing indicating signals of the position of the device at any given instant.

Another object of the instant invention is to provide a novel motor operator device which may be either electrically or manually controlled having means for preventing undesirable back-feed from the switch being operated to the motor operator device.

Another object of the instant invention is to provide a novel motor operator device having dynamic breaking means for halting rotation of the output shaft.

Another object of the instant invention is to provide novel means for disabling motor control of the operator device during the time in which manual control is being exerted.

Still another object of the instant invention is to provide a motor operator device having means for coupling the device output shaft to an air break switch or other similar means wherein the operator device and air break switch may be operated independently of one another for tests or other purposes.

Still another object of the instant invention is to provide a motor operator device having means for coupling the device output shaft to an air break switch or other similar means wherein the operator device and air break switch may be operated independently of one another for tests or other purposes and wherein the operator device may be padlocked in any one of a plurality of positions.

Still another object of the instant invention is to provide a novel housing for motor operator devices and the like.

These, as well as other objects of the instant invention will become apparent upon reading the accompanying description and drawings in which:

FIGURE 1a is an elevational view showing the manner in which the motor operator of the instant invention is employed to operate switches of the air break variety.

FIGURE 1b is a plan view of the switch portion of FIGURE 1a.

FIGURE 2 is a perspective view showing the housing for the motor operator of the instant invention.

FIGURE 3 is a perspective view of the motor operator of FIGURE 2 with the front cover removed.

FIGURE 4 is an elevational view of the operator device of FIGURES 2 and 3, showing certain elements thereof in greater detail.

FIGURE 4a is an end view of the motor operator of FIGURES 2–4.

FIGURES 5a and 5b are top and side views of the worm gear drive employed in the operator of FIGURES 2–4, with certain portions thereof being sectionalized.

FIGURE 6 is a circuit diagram outlining the electrical circuits of the operator of FIGURES 2–4.

FIGURE 8 shows a sectional view taken along the lines A—A of FIGURE 4a.

Figure 7A:
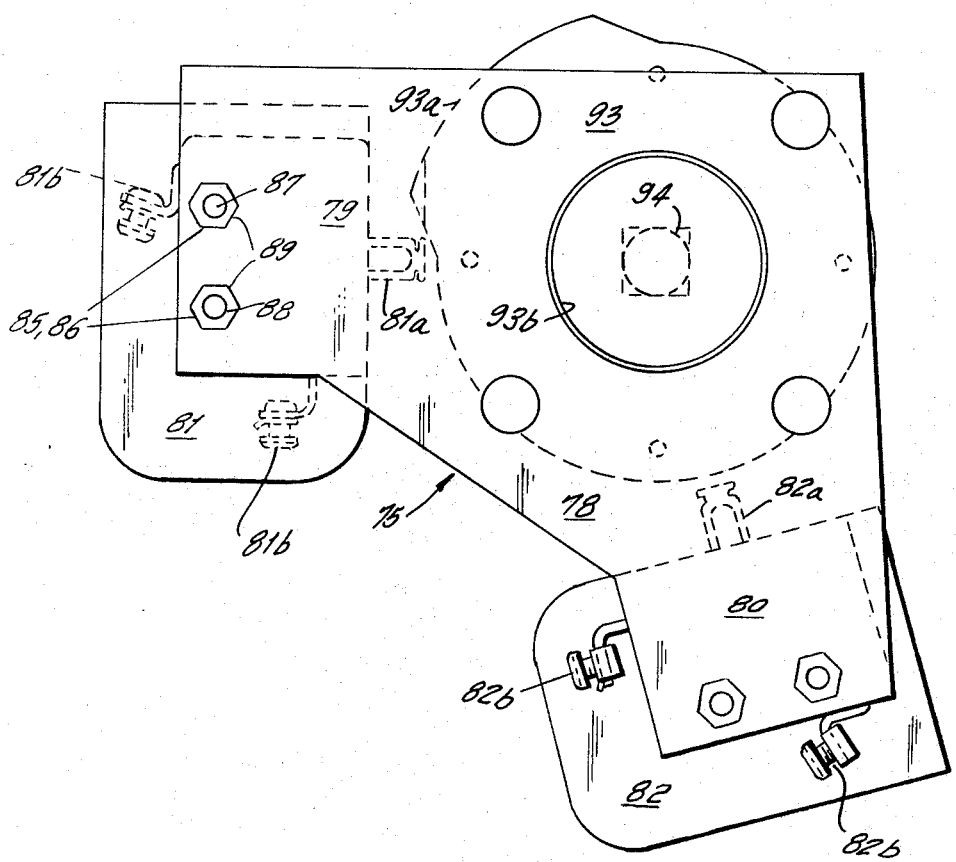
FIGURES 7 and 7b are top and side views, respectively, showing the cam operated switches of FIGURES 2–4 in greater detail.
Figure 8:
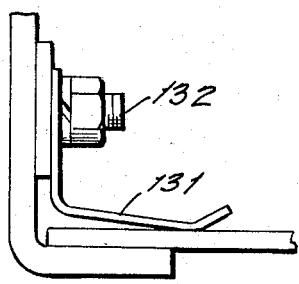

Referring to the drawings, FIGURE 1a shows a system arrangement 10 employing a motor operator 11 of the instant invention. The motor operator 11 may be supported and secured in any desired manner upon a base, or any other suitable support. The motor operator is provided with an output shaft which transmits its rotational movement through a coupler 13 to a vertical shaft 14. The vertical shaft 14, in turn, transmits this rotational movement to members 15a–17a of air break switches 15–17 in order to move the blades 15b–17b of these switches to their open and closed positions. The switches 16 and 17 are coupled to vertical shaft 14 through horizontal arms 18 and 19. The switches 15–17 are well known in the art and it is requested that reference be made to Patent No. 3,206,568, entitled "Dual Metal Electric Switch," issued Sept. 14, 1965, by Arem Foti; and Patent No. 2,673,902, entitled "Disconnect Switch," issued Mar. 30, 1954, by G. E. Heberlein, for specific structural and operating details thereof. It should be understood that the structure of switches 15–17 lend no novelty to the device of the instant invention and the instant invention may be employed to operate any device which may be adapted for operation under the control of a rotating member.

FIGURE 2 shows the housing of the instant invention in greater detail. The operator 11 of FIGURE 2 is comprised of an integrally formed back and top plate 20 and 21, respectively, as well as a front plate 22 and two side plates 23 (only one of which is shown). The front plate 22 may be removed in a manner to be more fully described, to allow removal of side plates 23 which may not be removed until front plate 22 is removed.

The front plate 22 is provided with first and second mounting brackets 24 and 25 for receiving and supporting a manually operating handle 26 comprised of a pivotally mounted handle portion 27, a handle arm 28, and a shaft 29 provided with slots 30 for engaging the manual input shaft, to be more fully described. The hollow shaft 29 is positioned through an opening 25a in bracket 25 and the handle arm 28 is positioned between the arms 24a–24b of bracket 24. Arm 24b is provided with an opening 24c for receiving a padlock (not shown) to prevent removal of the manual operating handle 26 by unauthorized personnel.

Front plate 22 is further provided with a pivotally mounted handle 31 which is shown in the closed position in FIGURE 2. In order to remove front cover plate 22 the handle 31 must be rotated clockwise in the direction shown by arrow 32. This movement is defeated by the handle 27 of manual operator 26, necessitating therefore the removal of the padlock from bracket 24 and the lifting of the handle 27 from the path of handle 31. Clockwise rotation of handle 31 rotates a cam member to be more fully described, to unlock the lower end of front cover plate 22 from the housing. The front cover plate 22 may be removed by moving the bottom edge outwardly in the direction shown by arrow 33 and then moving the front cover plate downwardly as shown by arrow 34, to release the top edge of front cover plate 22 from the flange 21a formed integrally with the top plate 21.

The side plates 23 may then be removed by moving their forward edges slightly outwardly in the direction shown by arrow 35 and then moving the entire side plate diagonally downward as shown by arrow 36 to release its top and rear edges from the top flange 21a and the side flange 20a, respectively. Handles 37 and 38 are provided on both side plates 23.

One of the couplers which may be employed with the operator is shown in FIGURE 2. The output shaft 12 of the operator has an annular member 39 secured to the top end thereof, which annular member is provided with a vertically aligned slot 40 (see FIG. 4a). A casting 41 having a central opening is positioned upon topmost portion of output shaft 12, as can best be seen in FIGURE 4. The upper end of this opening receives the lower end of a vertical shaft 14, as shown in FIGURE 1a, which is suitably keyed thereto by means of pin 42 which passes through aligned openings in the shaft 14 and casting 41. The casting 41 is provided with a vertical slot 43. A coupling arm 44 is pivoted to casting 41 by pin 45 and is provided with an aperture 44a at the lower end thereof. Projections 41a and 41b on opposite sides of slots 43 are each provided with openings 41c and 41d for receiving a padlock, in a manner to be more fully described.

The coupling assembly 13 is further provided with a substantially circular shaped base plate 46 having first and second brackets 47 and 48 secured thereto at two different angular positions around the base plate. Each of these brackets are provided with clamps 49 and 50 having elongated openings 49a and 50a (only one of which can be clearly seen in FIGURES 2 and 4) for the purpose of padlocking the air break switches in either the open or closed positions.

The operation of the coupling device is as follows: Considering FIGURE 2, with the coupler arm 44 in the position shown in FIGURE 2, it can be seen that the coupler arm is seated in the vertical slot 43 of casting 41 (see FIGURE 4), as well as the vertical slot 40 of annular member 39. This directly couples any rotation of shaft 12 to casting 41 and hence, to vertical shaft 14 (see either FIGURE 1a or 4). A padlock may be inserted through the openings 41c and 41d of projections 41a and 41b, respectively, to lock coupling arm 44 in this position.

If it is desired to lock the air break switches in either the open or closed positions and to release these switches from the control of the motor operated device 11, the coupler arm 44 is moved from the position shown in FIGURE 2 to the dotted line position 44' shown in FIGURE 4. The pivotally mounted clamp 49 is then rotated from the position shown in FIGURE 2 to the position shown in FIGURE 4 so as to receive the free end of coupling arm 44 through its elongated opening. A padlock may be inserted through the aperture 44a in coupling arm 44 to lock the casting 41 in this position. It can clearly be seen that operation of the motor operator 11 will in no way transmit rotation of its output shaft 12 to casting 41. However, to recouple casting 42 to shaft 12 the devices must be brought back into alignment in order to move coupler arm 44 back into the position shown in FIGURE 2.

FIGURE 4a shows an alternative coupler 13' which may be employed. This arrangement is comprised of a casting 41' having a central opening for receiving the top end of shaft 12 and the bottom end of shaft 14. Shaft 14 is secured to casting 41' by pin 42. The lower end of casting 41' is provided with a projection 41a' which is positioned within the recess 40 provided in annular member 39. This arrangement permanently keys shaft 14 to the operator output shaft 12 so that any operation of the motor operator will always be coupled to the air break switches through coupler 13' and vertical shaft 14.

FIGURES 3 and 4 show the operator device of FIGURES 1a and 2 with the front cover plate removed. The housing encloses a motor 51 which may be either a D.C. or A.C. motor having a spur gear 53 secured to its output shaft 52. The spur gear 53 meshes with a large diameter gear 54, preferably providing a 6:1 ratio. The gear 54 is mounted upon a shaft 55 provided with a pivot pin 56 projecting from opposite sides thereof, as shown in FIGURE 4a. This arrangement is for the purpose of keying shaft 55 to the slots 30 in the hollow shaft 29 of manual operating handle 26 shown in FIGURE 2.

The shaft 55 extends rearwardly through the hub portion 57 of gear 54 which receives portion 61 of shaft 55 of the worm and worm wheel assembly shown in detail in FIGURES 5a and 5b. A pin 58 is inserted through aligned openings in the gear hub 57 and shaft portion 61 to transmit rotational movement of gear 54 and shaft 55 to the worm gear shaft portion 61. The worm and worm gear assembly 60 is mounted within housing 62, as can best be seen in FIGURES 4a, 5a and 5b. As shown in FIGURES 5a and 5b, the housing 62 has a central opening 63 in which the shaft 64 is journalled. It can be seen in FIGURE 5b that shaft 64 protrudes through both the upper and lower ends of housing 62 and is arranged to rotate about its longitudinal axis.

A worm wheel 65 is rigidly secured to shaft 64 and is fully enclosed within housing 62. The worm wheel engages worm gear 66 which is pivotally supported at one end 66a by the ball bearing assembly 67 and at a point near the opposite end thereof by a ball bearing assembly 68. The shaft portion 61 is integral with worm gear 66 so that any rotation imparted to shaft 61 is directly transmitted to worm gear 66.

The motor control operation, energization of motor 51, rotates shaft 52 causing spur gear 53 to rotate large diameter gear 54, and is a preferably 6:1 ratio between gears 53 and 54. Rotation of gear 54 causes rotation of worm gear 66, in turn rotating worm wheel 65 and shaft 64 which is coupled to output shaft 12 by a suitable pin means 69. There is a 62:1 ratio between worm gear 66 and worm wheel 65. Also, the worm gear 66 is provided with a small helix angle to prevent any back feed of rotation from worm wheel 65 to worm gear 66.

The mounting base 70 for the worm gear and worm wheel assembly is secured to the vertical rear wall 20 of the housing by any suitable fastening means. The worm gear assembly 60 serves as a support for the motor 51 which has its mounting bracket 51a secured to a second mounting bracket 71 of assembly 70 by suitable fastening means 72. The air break switch operating effort is transmitted directly from the worm gear housing 62 to the motor mechanism supporting structure (i.e., housing) through the motor mechanism mounting bolts 73 (see FIGURE 4a). Therefore, the motor mechanism housing need only be weathertight and of a structural strength to support the dead weight of its components. The use of the worm gear housing 62 as the motor mechanism support provides the further advantage of having the same mounting dimensions for both motor operated and worm gear operated (i.e., manually operated) air break switches.

The lower protruding end of shaft 64, shown in FIGURE 5b, acts to position and support the cam operated switches which are employed for the purpose of performing the dynamic braking and shaft position indicating functions. The cam operated switch assembly 75 is shown best in FIGURES 4, 7a and 7b. This assembly is comprised of a top support member 76 which is fastened to the worm gear assembly housing 62 by means of the fastening members 77 shown in FIGURES 5b and 7b. The top support 76 is comprised of a flat central portion 78 having downwardly depending flanges 79 and 80 for stacking a plurality of cam operated switches 81 and 82 in a manner to be more fully described.

Bottom support member 83 having a configuration similar to top support 76 is arranged to cooperate with top support 76 to secure all of the stacked cam operated switches. Each of the depending arms 79 and 84 are provided with a pair of openings 85 and 86 for receiving a pair of elongated guide rods 87 and 88. The top ends of guide rods 87 and 88 are supported by arms 79 through fastening means 89. Each of the guide rods 87 and 88 pass through aligned openings in each of the cam operated switches 81 which are spaced apart from one another by suitable spacer members 90 which are provided between adjacent switches 81 and likewise contain a pair of holes for receiving guide rods 87 and 88. The switches 81 and spacers 90 are rigidly supported and secured by the fastening members 91 which threadedly engage the lower threaded portions of guide rods 87 and 88 to provide suitable compression between the arms 79 and 84.

The cam operated switches 82 are stacked between the arms 80 and 92 of top and bottom supports 76 and 83 in the identical manner to that previously described with respect to the stacked switches 81. Like elements therefore have been designated by like numerals which have been primed to distinguish between the two stacked groups of switches. The only distinction between the stacks of switches 81 and 82 is that each switch 82 is positioned at a level or height intermediate the levels of two adjacent switches 81, which arrangement can clearly be seen from a consideration of FIGURE 7b.

Each cam operated switch 81 and 82 is provided with a switch arm 81a and 82a, respectively, which arms project in the direction of the cam members, such as, for example, the cam member 93 shown best in FIGURE 7a. Although normally biased to the positions shown in FIGURE 7a, rotation of the cam member 93 to cause cam surface 93a to engage projection 81a will move the arm 81a inwardly to alter the position of switch contacts within the switch mechanism. The design of any cam operated switch is purely optional. For example, with the outward projecting arm 81a, its internal contacts may be in the closed position so that engagement of cam surface 93a causes the contacts to be moved to the open or disengaged position. If desired, however, the contact arrangement may be completely reversed depending only upon the needs of the user. Each switch 81 and 82 is provided with a pair of terminals 81b and 82b, respectively, for coupling the switch contacts into the operator electrical circuit.

The cams 93 are each provided with a circular opening 93b for receiving the square shaft 94 which has its upper end 94a received by the opening 64a of shaft 64 (see FIGURE 5b) and coupled thereto by suitable pin means 95.

Each of the cam members 93 are spaced from one another by a cam spacer 96, each of which has a square-shaped opening to key them to square shaft 94. The cam spacers 96 are each provided with a raised circular-shaped portion 96a and 96b, which enter into the circular openings 93b provided in adjacent cam members 93 so as to properly center and align each of the cam members. It can be seen from a consideration of FIGURE 7b that every other cam member, starting from the topmost cam member, is arranged to selectively engage one of the cam operated switches 81. The remaining cam members are arranged to selectively engage and operate the cam operated switches 82.

The entire stack of cam members 93 and their associated spacers 96 are rigidly secured to shaft 94 and the cams are prevented from experiencing any rotation relative to shaft 94 by tightly fastening the adjusting handle 97 upon the lower threaded portion 94b of shaft 94. Spring washers 98 and an additional spacer member 99 may be provided between the adjusting handle 97 and the lowermost spacer member 96' in order to insure that the adjusting handle 97 tightly fastens all of the cam members. As can clearly be seen, the stack of cam members and cam operated switches may be lengthened or shortened depending only upon the needs of the user and the total number of switches and cams employed is rather flexible.

With the adjusting handle 97 suitably tightened all of the cams 93 and spacers 96 are spring-loaded on the square center shaft 94 through the Belleville washers 98. By loosening adjusting handle 97 the spring pressure is reduced and the cams are then individually free to be rotated about the axis of shaft 94. The spacers 96 are not free to turn even though the spring loading has been substantially reduced because their square openings are keyed to the square shaft. However, the positioning of a spacer between adjacent cams permits the adjustment of any one cam while preventing any turning torque to be transmitted to any adjacent cam. Thus, each cam 93 may be individually adjusted (or later readjusted) without any concern for the angular orientation of any other cam within the cam stack.

Each cam may be provided with any desired cam surface in addition to providing the adjustability feature so that the associated cam operated switches may be employed to provide any one of a large variety of functions. Some of the more obvvious functions are to establish the electrical circuits for the dynamic braking function (to be more fully described), providing an indication of the open and closed positions of the switch; providing an indication of when the intermediate position of the switch (i.e., between open and closed) is reached. Any other functions may likewise be performed by the cam operated switches, which functions bear some relationship to the rotation of the worm assembly shaft 64 and hence the operator output shaft 12.

The motor operator may be electrically operated either locally or at some remote location by providing a suitable energizing signal to the operator. Considering the local operation, the front cover plate 22 may be removed in the manner previously described so as to expose the local controls 101 and 102 mounted to the interior plate 103. Let it be assumed that the air-break switches 15, 16 and 17 are in the closed position and it is desired to move the switches to the fully opened position. The opening switch pushbutton 101 is depressed, causing energization of motor 51. The cam operated switch indicating the present position of the air break switches and hence of the worm assembly shaft 64 may be employed to light a local lamp means 105 or a similar remotely located lamp means (not shown). With knowledge of the fact that the air break switches are in the closed position, the opening switch pushbutton 101 may be depressed to energize motor 51. The energization of motor 51 causes rotation of output shaft 12 through the gears 53, 54, 66 and 65 to output shaft 12 through the worm assembly shaft 64. As soon as the fully opened position is reached one of the cam operated switches 81 or 82 alters the operator electrical circuit to cause dynamic braking of the motor in a manner to be more fully described.

The operation is substantially similar for the case where the air break switches are in the fully open position and it is desired to move them to the fully closed position. This is done simply by depressing the "close" button 102 to energize the motor for rotation in the reverse direction. A selected cam operated switch then operates to provide the dynamic braking function in the reverse direction when the air break switches reach the fully closed position.

In the case where it is desired to manually operate the air break switches to either the open or closed position the manual operating handle 26 shown in FIGURES 2 and 4a is inserted through an opening 107 in shutter member 106 which is pivoted to plate 103 at 108. The shutter 106 by force of gravity is normally held in the position shown in FIGURE 4 so that its opening 107 is offset relative to manual input shaft 55. Thus, in order to key the slots 30 of operating handle 26 to the pin 56 of shaft 55 the shutter 106 must be rotated clockwise about its pivot 108 as shown by the arrow 109, to bring opening 107 into alignment with shaft 55. The travel of shutter 106 is limited by the fastening member 110 which is secured to plate 103 and which passes through an arcuate slot 111 provided in shutter plate 106.

One side of shutter plate 106 is provided with a cam surface 112 for engaging the projecting arm 114 of a switch member 113. With the shutter 106 in a normal position shown in FIGURE 4, cam surface 112 is disengaged from arm 114. When the shutter plate is rotated clockwise about its pivot 108 in order to insert the hollow shaft of the manual operating handle, cam surface 112 engages arm 114 causing the switch contacts (not shown) of switch 113 to open thereby preventing energization of motor 51. This arrangement protects the operator against either accidental or deliberate energization of motor 51 while he is attempting manual operation of the device 11.

The rotation of manual arm 26 is facilitated by the 62:1 ratio between the worm gear and the worm wheel to enable either opening or closing of the air break switches to be performed simply and readily by one person.

FIGURE 6 shows the electrical circuit 115 for the A.C. operator device. Energy from a local source is coupled between the input terminals $L_0$ and $L_1$. Separate switches 116, 117 and fuses 118 and 119 are provided to isolate the circuit from the local energy source and to protect against full or overload current conditions, respectively. The manual operation disconnect switch 113 has its contacts normally closed and operate to open when a manual operation is performed to prevent the local power source from being coupled to motor 51.

The motor 51 is provided with balanced windings 120 and 121. Terminals at one end of these windings are coupled in common to lead 122. The opposite ends of the windings are connected to the starting condenser 123 and the normally closed contacts 124a of relay 124. The operation of the A.C. energized motor is as follows:

Let it be assumed that the motor operator is intended to open a closed air-break switch. Contactor coil TC is energized either by local control, previously described, or by remote control, by closing switch T. Energizing contactor TC causes all TC contacts to close, sealing-in the contactor coil, and energizing the tripping field 121 of the motor. The motor will continue running in the tripping direction until limit switch aa (one of the cam operated switches previously described) opens its contacts. At this point dynamic braking is initiated.

Dynamic braking of the A.C. operator is better defined by referring to FIGURE 6 and the motor operation just described. When contactor TC is energized, relay 124 is simultaneously energized and its contact 124a opens after the motor reaches a predetermined speed. When limit switch aa opens, relay 124 becomes de-energized and contact 124a closes. This short-circuits the two motor field windings, thereby braking the action of the motor.

Dynamic braking for the D.C. operator was described previously.

In the case where it is desired to instantaneously stop the motor, regardless of its position, the local stop pushbutton 125 (see FIGURES 4 and 6) may be depressed. This deenergizes contactor coil CC or TC, whichever the case may be, and thus causing dynamic braking to be established and the motor generation to cease.

The fuses 118 and switch means 116 are physically shown in FIGURE 3. The physical location of the relays 124 are shown at 126 within the housing. A space heater 127 is provided for maintaining the housing interior at a suitable operating temperature. The space heater is preferably provided with a thermostatic control for regulation thereof.

The manner in which the front cover plate 22 of FIGURE 2 is secured to the housing proper is best shown in FIGURE 3. The floor 128 of the operator housing is provided with an angle arm 129 rigidly secured thereto. Handle 31 shown in FIGURE 2, is rigidly coupled to a second arm 130 through a suitable shaft means (not shown) with the handle 31 in the position shown in FIGURE 2. Arm 130 occupies the solid line position of FIGURE 3. When the handle 31 is rotated in the clockwise direction, shown by arrow 32, this moves arm 130 to the dotted line position 130' releasing it from angle arm 129 so as to enable removal of the front cover plate 22 from the housing proper.

The front cover plate is provided with vertical flanges 22a and 22b along opposite edges thereof which curve around the side plates 23 cooperating with the flanges 21a and 22a previously described, to prevent removal of the side plates 23. The side plates are kept from vibrating by means of the spring clips 131 secured to the back wall 20 of the housing by fastening means 132.

Each of the side plate handles 37 and 38 are provided with openings 37a and 38a which communicate with the housing interior through apertures 23a provided in the side plates 23. Small screens may be mounted across the apertures 23a and maintained in position by the fastening means 23b to prevent dust particles from entering into the housing. Since the openings 37a and 38a in handles 37 and 38, respectively, project downwardly the housing is permitted to "breath" and yet no rain or moisture can enter into the housing interior.

It is possible to exert manual control over the operator device without removal of the front cover plate 22. This may be performed by unlocking the manual handle 26, removing it from its brackets and hence freeing a pin 135 secured to plate 136 which is pivoted to front cover plate 22 by fastening means 137. The upper arcuate edge 136a of plate 136 is arranged to slide beneath an arcuate shaped member 138 fastened to front cover 22. The front cover plate 22 is provided with a circular opening (not shown) which is normally sealed with the handle 26 in the position shown in FIGURE 2. It is not possible to rotate plate 136 so as to unseal the opening due to the fact that pin 135 is blocked by the hollow shaft portion 29 of manual handle 26. Removal of the manual handle 26 from its brackets 24 and 25 allows the plate 136 to be rotated counterclockwise about its pivot 137 to unseal the opening provided in cover plate 22. Manual operation may then be effected by inserting the forward end of hollow shaft 29 through the opening in cover plate 22 and the opening 107 in shutter plate 106 (see FIGURE 4). By lifting the hollow shaft 29 of handle 26 substantially vertically upward the shutter plate may be rotated to move hollow shaft 29 into alignment with manual input shaft 55 (see also FIGURE 4a) to enable these shafts to be keyed to one another.

Removal of the operating handle from the engaged position causes the shutter to drop to its normal position shown in FIGURE 4 thereby enabling the operator device to be electrically controlled. The manual operating handle may then be replaced within its support brackets 24 and 25 so that the pin 135 lies above hollow shaft portion 29 to prevent ingress into the housing through the cover plate opening which is sealed by the plate 136.

It can be seen from the foregoing that the instant invention provides a novel operator device capable of either manual or electrical control in which operator position at any given instant and dynamic braking functions are automatically performed by means of stacks of cam operated switches which are adjustable to a variety of positions. A variety of coupling means are provided for effecting either positive non-defeatable coupling between operator and air break switch or of a defeatable type coupling in which either air break switch or operator may eb activated independently of one another for test, maintenance, or other purposes. The mechanism is capable of developing an emergency output torque of 10,000 inch-pounds A.C. operation and 22,000 inch-pounds D.C. operation at the operating shaft through the use of a double gear reduction with an overall ratio of 372:1. The mechanism will operate switches in approximately four seconds and has been found to be extremely advantageous for use with three pole switches having 400–4000 ampere rating up to and including 161 kilovolts.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Operator means for providing a rotational output comprising;

motor means having a first shaft and an output shaft;
first and second gear assemblies coupling rotation of said first shaft to said output shaft;
a manual operating handle assembly;
said second gear assembly including a manual input shaft for receiving said manual operating handle assembly;
means normally sealing said manual input shaft being movable to a first position to permit coupling of said handle assembly to said manual input shaft;
said sealing means further comprising means to prevent operation of said motor means when said sealing means is in said first position.

2. The operator of claim 1 wherein;

said second gear assembly is a worm gear assembly comprised of a worm gear having a first end coupled to said first gear assembly and a worm wheel driven by said worm gear;
the helix angle of said worm gear being relatively small to prevent backfeed from said worm wheel to said worm gear.

3. The operator of claim 1 further comprising; a coupler assembly for coupling the operator output shaft to the input shaft of an output utilization device, said coupler assembly comprising a casting having a central opening;
said output shaft having an annular ring positioned near one end of said output shaft;
said annular ring having a recess aligned substantially parallel to the axis of said output shaft;
a first end of said casting being positioned upon said output shaft and resting upon said annular ring with a portion of said output shaft;
a coupler bar having a first end pivotally coupled to said casting and movable to a first position into said recess and a second position removed from said recess.

4. The operator of claim 3 wherein said coupler is further comprised of;

first and second projections on opposite sides of said coupler bar;

each of said projections having apertures for receiving means to lock said coupler bar in said first position.

5. The operator of claim 4 further comprising;
the second end of said coupler bar having an aperture;
a plurality of brackets secured to said operator;
each of said brackets having pivotally mounted handles;
each handle having an elongated slot for receiving the second end of said coupler bar;
the aperture in said coupler bar being adapted to receive means for locking the casting in one angular position while permitting operation of said operator for test, maintenance or other purposes.

6. The operator of claim 1 further comprising a cam operated switch assembly comprised of;
first and second end brackets and a plurality of switches being stacked one upon the other;
fastening rods for securing said stack of switches between said brackets;
a rod having a first end secured to said output shaft;
said brackets each having openings for receiving said rod;
a plurality of cams each having a central opening being stacked one upon the other with their openings in alignment;
said rod being positioned through said openings;
adjustable handle means threadedly engaging the second end of said rod for maintaining said cams under compression;
a plurality of spacer means each being interspersed between adjacent cams;
each of said spacers being keyed to said rod to prevent rotation of said spacers relative to said rod;
each of said spacers having circular projections on opposite surfaces thereof extending into the openings of adjacent cams;
said cams being individually adjustable to any angular position;
said spacers preventing torsion forces exerted upon said cams to adjust their angular position from being transmitted to the remaining cams in said stack.

7. The operator of claim 6 wherein each of said switches are comprised of movable projections normally biased to extend toward an associated cam;
the rotation of said rod causing rotation of said cams for selectively moving said projections away from said cams.

8. The operator of claim 7 further comprising;
circuit means coupled to selected ones of said cam operated switch means for dynamically braking the motor means when said output shaft reaches predetermined angular positions.

9. The operator of claim 1 further comprising a housing enclosing the operator assembly;
said housing having a removably mounted front cover;
a front cover handle having a first position for locking said front cover to said housing and being rotatable to a second position for unlocking said front cover from said housing;
bracket means for mounting said manual operating handle assembly upon said front cover;
a portion of said handle assembly preventing movement of said front cover handle to said second position when said handle assembly is mounted upon said bracket means.

10. The operator of claim 9 wherein said front cover is provided with an opening substantially in alignment with said manual input shaft;
a cover plate pivotally mounted to said front cover being movable to a first position sealing said cover opening and a second position to unseal said opening;
said cover plate having a projecting pin extending outwardly from said housing to prevent movement of said cover plate from said first position when said handle assembly is mounted upon said bracket means.

11. The operator of claim 9 wherein said operator housing is further comprised of first and second removable side plates;
said front cover having flanges along the vertical edges overlapping the marginal edges of said side plates to prevent their removal from said housing when said front cover is secured to the operator housing.

12. The operator of claim 2 further comprising a first housing enclosing the operator assembly;
a second housing enclosing said worm gear assembly;
said second housing being secured to one wall of said first housing;
said motor means being mounted to said second housing;
said second housing comprising a shaft secured to said worm wheel and having a first end coupled to said output shaft.

References Cited
UNITED STATES PATENTS

| | | | |
|---|---|---|---|
| 2,081,686 | 5/1937 | Thomas | 335—73 X |
| 2,166,137 | 7/1939 | Friedman et al. | 335—74 X |
| 2,282,007 | 5/1942 | Smith | 335—73 X |

ROBERT K. SCHAEFER, *Primary Examiner.*

H. HOHAUSER, *Assistant Examiner.*